United States Patent [19]

Mitchelson

[11] Patent Number: 5,408,323
[45] Date of Patent: Apr. 18, 1995

[54] POSITION FIXING APPARATUS WITH RADIATION SENSOR

[75] Inventor: David L. Mitchelson, Loughborough, both of England

[73] Assignee: British Technology Group, Ltd., London, England

[21] Appl. No.: 50,034

[22] Filed: Apr. 30, 1993

[30] Foreign Application Priority Data

Oct. 20, 1990 [GB] United Kingdom ............. 9022873

[51] Int. Cl.6 ................................ G01B 11/00
[52] U.S. Cl. ........................ 356/375; 250/206.1; 250/237 G
[58] Field of Search ............. 356/141, 152, 373, 375; 250/206.1, 206.2, 237 G

[56] References Cited

U.S. PATENT DOCUMENTS

| | | | |
|---|---|---|---|
| 3,858,201 | 12/1974 | Foster | 356/141 |
| 3,882,482 | 5/1975 | Green et al. | 356/152 |
| 4,857,721 | 8/1989 | Dunavan et al. | 356/141 |

FOREIGN PATENT DOCUMENTS

| | | |
|---|---|---|
| 2381321 | 9/1978 | France . |
| 1137475 | 1/1966 | United Kingdom . |
| 1257523 | 12/1971 | United Kingdom . |
| 1380144 | 1/1975 | United Kingdom . |

OTHER PUBLICATIONS

Patent Abstract of Japan, vol. 013, No. 037 (P-819) 27 Jan. 1989 & JP,A,63 235 869 (Hitachi) 30 Sep. 1988—see abstract.

Primary Examiner—F. L. Evans
Attorney, Agent, or Firm—Cushman, Darby & Cushman

[57] ABSTRACT

Apparatus for the determination of the position of an object included a radiation sensor (16) sensitive to spatial variations, in at least one direction, of intensity of radiation received from a region of observation (6). A mask (14) attenuates the radiation in a random spatially-variant manner whilst sampling (18) and calculating means (20) determine the autocorrelation function of the received pattern with previously stored values to sense the position of an object (8).

7 Claims, 4 Drawing Sheets

POSITION FIXING APPARATUS WITH RADIATION SENSOR

FIELD OF THE INVENTION

This invention relates to position fixing, particularly to the use of position tracking of movement. The accurate assessment of movement is utilized in a number of fields, such as, for instance, in medicine to analyse the range of mobility of a repaired limb, in sport to correct a competitor's body technique, or in industry to monitor machine vibrations.

BACKGROUND OF THE INVENTION

Existing systems for tracking movement tend to have a limited resolving power, that is, the noise associated with the system limits the accuracy with which positions are fixed. The systems generally have a lens which focuses the image of an object on to a light sensitive surface, such as, for example, a surface consisting of an array of charged coupled devices. Each charge coupled device (ccd) is an optical sensor element that reacts to incident light by acquiring an electrical charge. The distribution of charges amongst the elements matches the distribution of light in the image. Each of the elements is sampled, and the image is reproduced, for instance, on a screen, according to the charge distribution.

It is common when tracking movement to monitor specific points on the object under observation by continually fixing the position of the points. From this it is possible to trace not only the path of movement but also the velocity and acceleration components, given that the points are monitored at a known frequency. The points are usually identified either with a source, such as an LED, or a marker capable of reflecting a projected light, for example, a prism or reflective tape. The points are reproduced, in the manner described above, as point images, for instance, on a screen.

In the case of a point source of light, the power with which the location of the point source is resolved will be limited by the fact that the image of the point source will be focused by the lens on to a limited number of elements. The total resolution will consequently be restricted by the individual resolving power of each of the elements on to which the image is focused, and the potential resolving power of the remainder of the elements Is unutilized.

SUMMARY OF THE INVENTION

According to the invention there is provided apparatus for the determination of the position of an object comprising radiation sensing means sensitive to spatial variations, in at least one direction, of Intensity of radiation received from a region of observation, mask means positioned between said sensing means and said region of observation and adapted to attenuate said radiation in a predetermined spatially-variant manner in said direction, and correlating means adapted to correlate an output signal from said sensing means with a set of previously stored values.

The invention provides apparatus for position fixing a point source of radiation, and the apparatus comprises a detector having a radiation sensitive surface divided into elements, a mask between the source and the detector, and the degree of transmission of radiation through each particular area of the mask being determined according to a random pattern, and means for sampling the elements of the radiation sensitive surface to determine the Intensity of the radiation incident upon each element.

In one embodiment of the invention, the mask consists of a sheet material sectionally divided alternately into parallel transparent and opaque bands. The widths of the bands are calculated entirely at random, so that there is no repeat pattern of the bands throughout the mask and the pattern has an autocorrelation function with a unique maximum.

In a second embodiment of the invention, a sheet material mask has a transmission coefficient which varies continuously along the length of the mask. The variation in the transmission coefficient is analogue in nature and follows a random pattern, preferably determined according to a summation of many spatial frequencies, where each frequency has a random phase with respect to a given spatial reference point, for example, the left hand end of the mask. The variation in the transmission coefficient may be defined as:

$$T = \sum_{i=1}^{n} \sin\left[\frac{(2\pi i)x}{nL} + p(i)\right]$$

in which T is the optical coefficient at any point n along the full length L of the mask; n is the number of sinusoids being summed to produce the pattern; and p(i) is the random phase offset of the ith sinusoid. The mask has a unique autocorrelation maximum, and has the advantage over the mask described above as having alternate opaque and transparent bands in that there is an improvement in the ratio of the autocorrelation maximum to the autocorrelation minima away from the maximum.

The apparatus according to the invention does not have a lens for focusing an image of the point source. The mask interferes with the radiation from the source and casts a pattern of different radiation intensities on to the sensitive surface. The pattern of radiation intensities is located by sampling the response of each of the elements of the sensitive surface. The position of the point can be fixed by comparing the located pattern with the mask pattern. The resolving power of the apparatus is enhanced because the use of the numerous areas of different radiation intensity produced by the mask enables a large number of elements from the sensitive surface to contribute, effectively as an averaging technique, to the determination of the position of the point source, rather than a limited number of elements identifying a focused image. By having no lens there are also no lens aberrations or focusing effects.

The sensitive surface is preferably provided as an array of charge coupled devices, but could equally well be the signal plate of a conventional television camera.

The apparatus according to the invention is able to fix a position in only one dimension, and separate apparatus is required for each dimension in the case of two- or three-dimension position fixing.

Alternatively, the apparatus could fix a position in two dimensions by having a mask with a transparent and opaque pattern randomized in two dimensions.

Three mask patterns, each one responsive to a different primary color, may be optically mixed to form a single mask. The autocorrelation maximum corresponding to each mask pattern may then be detected using a detector fitted with color filters, each having the same spectral transmission as the colors used to produce the mask. Using this method the color of a point source of light under observation can be determined. This enables the identification of point sources by color.

The invention also provides a mask of sheet material through each of the opposite sides of which the transmission of radiation at each particular area is determined according to an individual random pattern, the individual random patterns according to which the transmission through each of the opposing sides is determined being exactly coincident when viewed normal to the plane of the sheet material.

The mask will transmit a sharp maximum when the incident radiation is normal to the sheet material but will attenuate radiation from other directions. Peak transmission is 50% of normally incident radiation and 25% on average from other directions, so the unique peak indicates when the incident radiation is normal to the sheet material and hence the mask patterns. The unique peak can be detected with a single photodetector, which consequently acts as a direction finder.

BRIEF DESCRIPTION OF THE DRAWINGS

The invention will be described with reference to the accompanying drawings in which.

DESCRIPTION OF THE PREFERRED EMBODIMENTS

Figure 1:
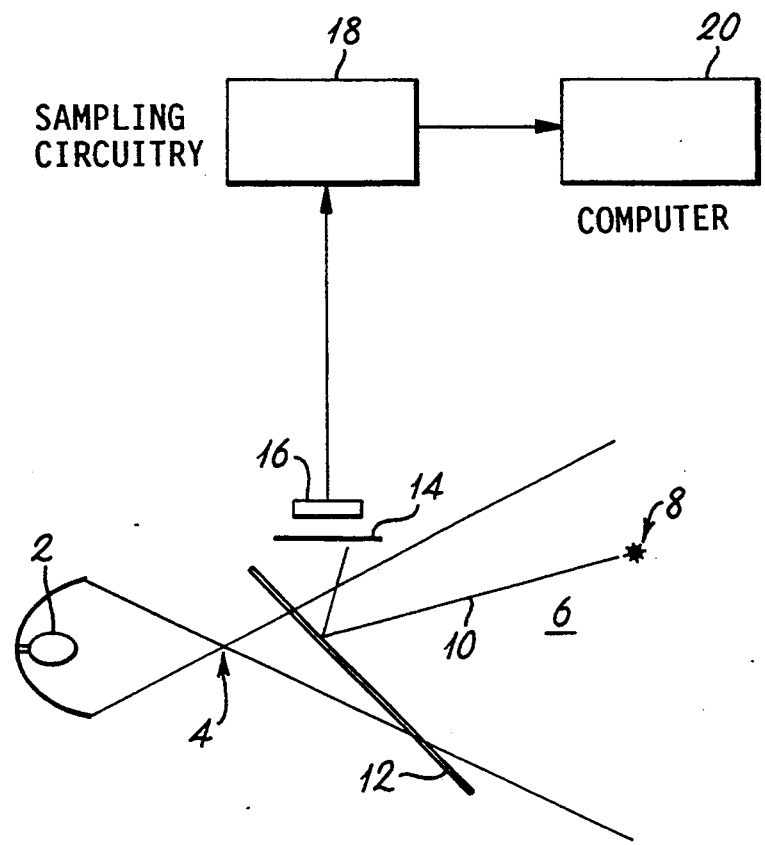
FIG. 1 is a schematic of a system for position fixing incorporating the apparatus according to the invention.

Referring now to the drawings, the system shown in FIG. 1 has a light source 2 which projects light through the rear of a half silvered mirror 12, arranged at 45° to the optical axis of the source 2. The primary focus 4 of the projected light is on the rearward side of the mirror 12. Within the field of view 6 of the projected light is a reflective marker 8 placed at a specific point upon an object (not shown). Light is reflected by the marker 8, in one instance, along the path 10. The light from the marker 8 is reflected by the mirror 12 on to a mask 14, arranged at 90° to the optical axis of the source 2 and the same distance from the mirror 12 as the primary focus 4 of the source 2.

Figure 2:
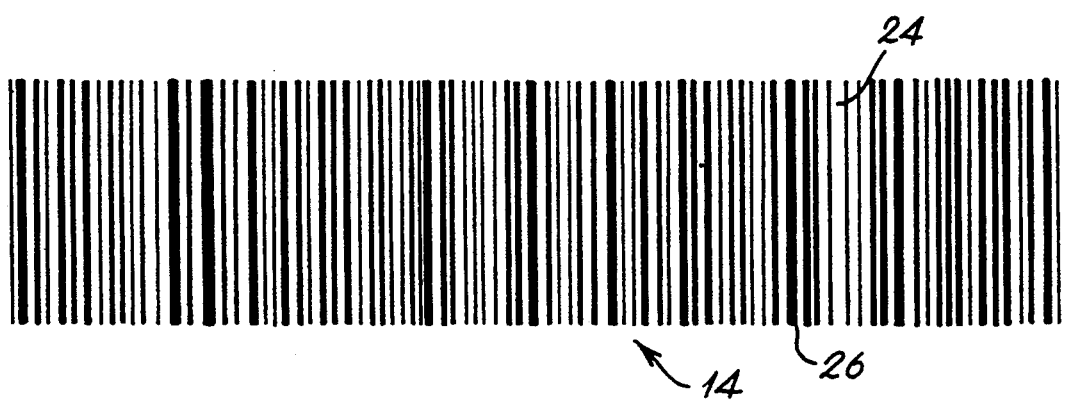
FIG. 2 is an example of the form of pattern taken by the mask used in the system shown in FIG. 1.

The mask 14 is patterned with transparent and opaque areas. A typical mask pattern is shown in FIG. 2. A rectangular sheet of material is axially divided into alternately parallel transparent and opaque bands 24,26. In practice the sheet material would be transparent, and the opaque bands would be imprinted on to the sheet. The width of the bands 24,26 is decided entirely at random, so that there is no repeat pattern of bands 24,26 throughout the mask 12. The random configuration of the bands determines the autocorrelation function of the mask 12.

Figure 3:
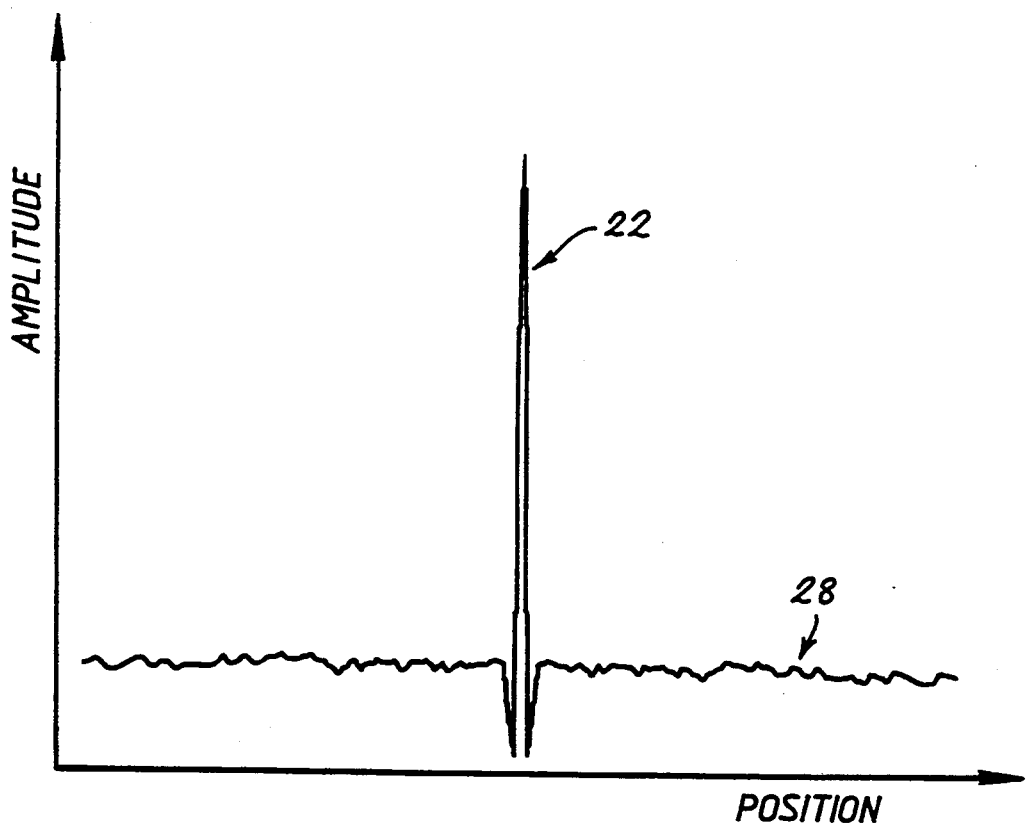
FIG. 3 is a graphical representation of the autocorrelation function of the mask shown in FIG. 2.

The autocorrelation function of the mask 12 is graphically represented in FIG. 3. The vertical axis of the graphical representation is a measure of light amplitude, and the horizontal axis shows how the transmitted light varies for two identical mask patterns if one of the masks is placed in front of the other and moved from left to right. There is one unique and very sharp maximum 22 when the two patterns are exactly superposed. Otherwise there is a minimal transmission of light shown at 28.

Reverting to FIG. 1, situated behind the mask 14 is an array 16 of optical sensor charge coupled devices. The array is linear and may consist of as many as 4096 individual charge coupled elements.

The attenuation by the mask 14 on the light reflected from the mirror 12 causes a shadow pattern matching the mask pattern to be cast on to the sensor array 16. Sampling circuitry 18 identifies the position of the shadow boundaries cast by the mask pattern by reading out the charge induced on each element depending on whether there is incident, or absent, light. The sampling circuitry produces a digital signal which is representative of the light incident upon each element. Each of the digital signals is stored in a memory location of a computer 20, so that the complete memory contents is representative of a full 'picture' of the shadow pattern cast across the array 16.

The ccd elements respond with outputs which are a finely graded analogue of the incident light intensity. So, for example, if the mask pattern is in the form of an analogue variation similar to electronic white noise (sum of sinusoids of different frequencies with random phase offsets) then it is possible for the intensity of the light falling on any given element to take any value in the dynamic range of the ccd, with corresponding signal at its output. Similarly, even if the mask pattern is in the form of alternating opaque and transmitting lines (e.g. a Barker Code) and the sharp edge of a shadow falls on a particular ccd element then the output from that element will be proportional to the light falling on it (i.e. proportional to the position of the sharp edge across the width of the element).

Also stored within the memory of the computer 20 is a replica set of values representing the mask pattern. The computer 20 is able to carry out the correlation, as described above and shown in FIG. 3, by comparing the memory contents. The computer 20 determines the position of the shadow cast on the array 16 by superimposing the memory contents, in the same manner that the two masks would be superimposed during the manual correlation, establishing at which location the two patterns would have to be superposed to produce the unique maximum 22 of the autocorrelation function. The precise position of the marker 8 is determined by calculating from what location a shadow pattern of the form identified would be cast by a point source, that Is, the marker 8.

An indication of the position and movement of an entire body can be calculated by locating a number of markers 8 at points all over the body. The position of each point is continually fixed and enables an image of the behavior of the entire body to be built up and displayed upon a screen (not shown).

To obtain the highest possible resolving power the replica of the mask pattern stored In the computer memory must contain the smallest increments in position of the shadow. That is, as the shadow moves a tiny increment in one direction the output of each element of the ccd changes by a small (but different) amount depending on the form of the shadow at that part of the array. The computer replica must therefore be capable of reproducing these array-wide sets of small changes to each element as the whole pattern moves across the complete range of measurement.

For an array of N elements, if each element responded in simple on-off fashion the resolution of position of the shadow of single straight edge would simply be I part in N. If however the amplitude of the output from each element is quantified into S levels then the position of the shadow can be resolved to 1 part in S across each element and hence to 1 part in (N×S) across the whole array. Furthermore if the illumination is spread across the whole array as in the shadow mask then the signal resolution is improved by a factor of $\sqrt{N}$ by RMS averaging across the N elements.

Hence the maximum theoretical resolution for an array of N elements and amplitude quantisation S is:

Resolution=1 part in N×$\sqrt{N}$×S

This is the case if the signal level in each element is equally likely to take any one of the S values in its amplitude range. In practice the spatial distribution of shadow patterns which are useful in producing a single sharp correlation peak are such as to limit the 'independence' of signal level in each element to about one quarter of the total amplitude range. Consequently, the above formula should be modified for practical purposes to:

$$\text{Resolution} = 1 \text{ part in } \frac{N \times \sqrt{N} \times S}{4}$$

So, for example, if the ccd array contains 1024 elements and the output of each element is quantized into 1024 possible amplitude levels then the resolution would be:

$$1 \text{ part in } \frac{1024 \times 32 \times 1024}{4}$$

i.e. better than 1 part in 8 million.

Figure 4:
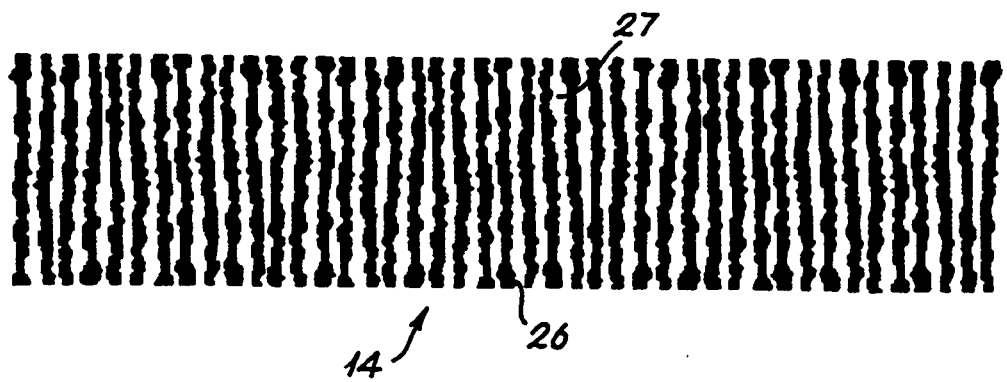
FIG. 4 is an alternative form of pattern taken by the mask used in the system shown in FIG. 1, the mask having a pattern randomized in two dimensions.

The mask shown in FIG. 2 is only capable of being used to locate the position of the marker B in one dimension. By combining a number of pieces of the apparatus shown in FIG. 1, each dedicated to a particular dimension, it is possible to make multiple dimension calculations. It is, however, possible, using the mask type 14 shown in FIG. 4, to determine the position of the marker 8 in two dimensions. The alternate bands 24,26 of the mask 14 are randomly calculated in two dimensions, so that the mask 14 has a unique two dimensional autocorrelation function. It is possible using the function to calculate the position of the marker 8 in two dimensions.

The overall position resolution of the system shown in FIG. 1 is dependent not only upon the number of elements that make up the array 16 and the signal to noise ratio of each of the elements, as is the case in a conventional lens based system, but is additionally dependent upon the square root of the number of elements. This is because, unlike in the conventional lens based system, the use of signals from all of the elements in the array, instead of only those on to which an image is focused, introduces an averaging factor of the square root of the number of elements in the array into the calculation of position resolution.

A transparent sheet material having a mask pattern, such as that shown in FIG. 2, applied to each of its opposing faces can be used in direction finding. The patterns are arranged on the opposing faces such that they are coincident when viewed normal to the plane of the sheet material. The mask (not shown) will transmit a sharp maximum when incident light is normal to the mask, but will attenuate light incident from other directions. Peak transmission is 50% of normally incident light and 25% on average from other directions. When the mask is placed in front of a single photodetector (not shown), the resulting output from the detector will give a sharp peak whenever incident light passes across normal incidence. The sharpness of the peak as a function of the angle of incidence will depend on the ratio of the distance represented by the smallest spatial frequencies of the mask pattern and the thickness of the sheet material. As an example, for a mask pattern which has spatial frequencies of up to 100/mm separated by a 3 mm thick sheet of material, a maximum peak can be expected to have an angular width of 11 minutes. With a detector having a signal to noise ratio of 1000, this permits resolution of incident beam angle to in excess of 0.6 seconds.

Preferably, analogue forms of the shadow mask are realized as a sum of sinusoids with random phase offsets as this format gives a sharp autocorrelation peak and residual side peaks of near zero amplitude.

The situation is different for binary sequences, that is, for versions of the shadow mask which take the form of alternating translucent and opaque lines of various widths. Sequences known as Barker Codes or 'perfect words' have the minimum possible side peaks in the autocorrelation function. (Barker, RH. 'Group synchronising of binary digital systems, communication theory,' Academic Press, New York" 1953. (Symposium on Communications Theory, at IEE, London, Sept 1952)). If the length of the sequence is N, the amplitude of the correlation peak is N, and the residual side peak amplitudes are no greater than plus or minus 1. The maximum code length possessing this property is only 13. It is as follows; 1, 1, 1, 1, 1, 0, 0, 1, 1, 0, 1, 0, 1. Combinations of Barker codes may be assembled to achieve longer sequences which are 'good words', and these may also be used for the shadow mask.

Figure 5:
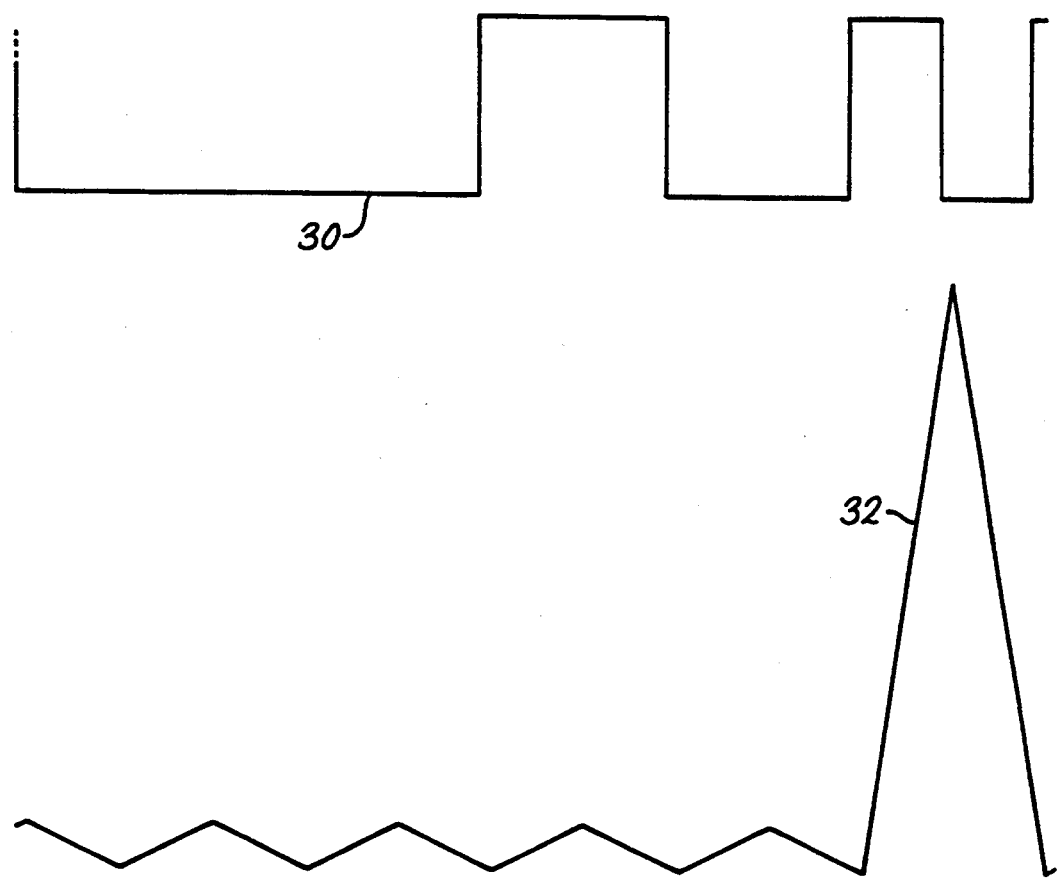
FIGS. 5 and 6 show Barker code sequences and their corresponding autocorrelation functions.
Figure 6:
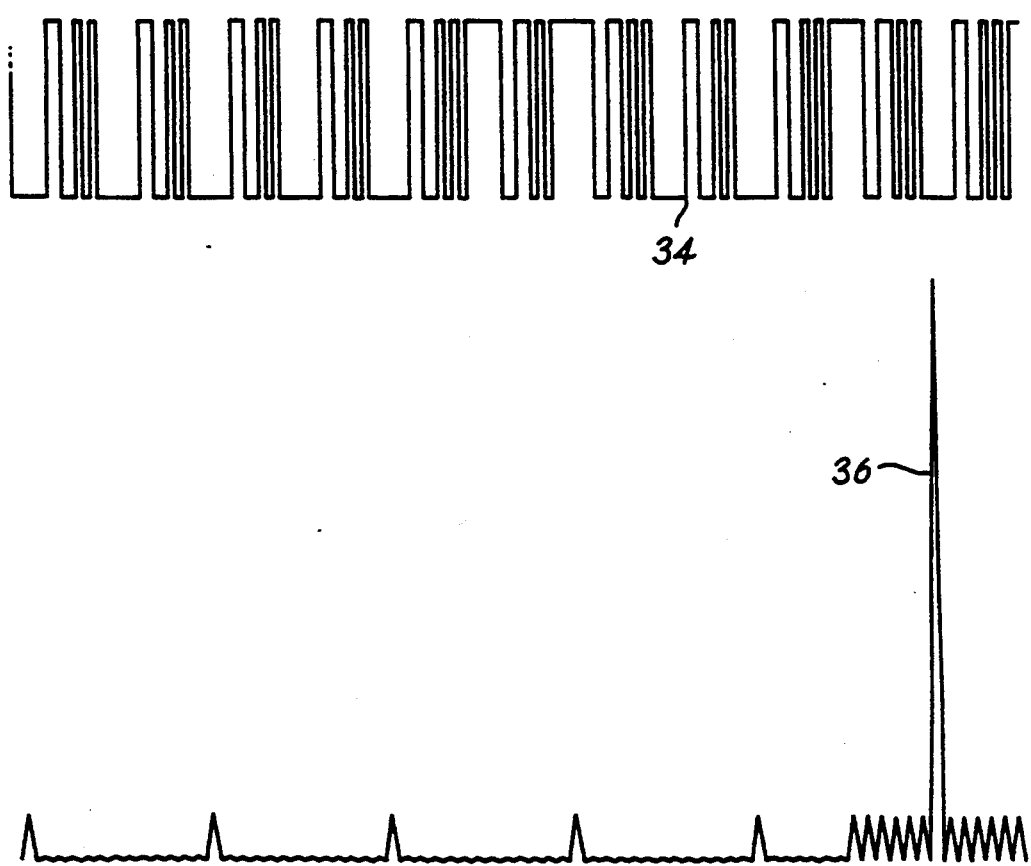

Barker codes may also be used to provide fiducial marks in the autocorrelation plot. If each segment of a Barker code of length N is further encoded by the same Barker code thereby producing a code sequence of length N×N, then the amplitude of the peak is N×N and the side peak level everywhere less than 2 except for a N regularly spaced sharp subpeaks of amplitude N. The attached drawings illustrate this effect for the Barker code of length 13. FIG. 5 shows a simple Barker code sequence for N=13 30 with its corresponding autocorrelation function 32. The side peaks of the latter extend symmetrically about the main peak, but, for simplicity, only the left side of the plot is shown. FIG. 6 illustrates the Barker code squared for N=13. Each segment of the first Barker sequence has a further sequence of 13 fitted into It. This gives rise to a sharpening of the main peak 36 and provides side peaks which may be used for fiducial purposes.

Although Barker codes are particularly effective at producing an autocorrelation plot with very low and regular variations away from the main peak, and as such are attractive forms for the shadow mask, in general, the addition of any periodic function to the defining function of the shadow mask will result in an autocorrelation plot which has regular side peaks of the same spatial period. Their amplitude will be in the same proportion to the main peak as the ratio of the amplitude of the added periodic function to the defining function of the shadow mask.

Although the invention has been described in relation to position determination using optical radiation, it will be clear to those skilled in the art that the principles are equally applicable to techniques using, for example, acoustic radiation.

I claim:

1. Apparatus for the determination of the position of an object comprising
   radiation sensing means sensitive to spatial variations, in at least one direction, of intensity of radiation received from a region of observation,
   mask means positioned between said sensing means and the region of observation for attenuating the received radiation in a predetermined spatially-variant manner in the at least one direction; and
   correlating means for correlating an output signal from said sensing means with a set of previously stored values.

2. Apparatus for the determination of the position of an object as claimed in claim 1 wherein said mask means has a transmission coefficient which varies continuously in the at least one direction, is analogue in nature and follows a random pattern.

3. Apparatus for the determination of the position of an object as claimed in claim 2 wherein the pattern is determined according to a summation of a plurality of spatial frequencies, each frequency having a random phase with reference to a predetermined spatial reference point.

4. Apparatus for the determination of the position of an object as claimed in claim 1 wherein said mask means comprises a plurality of alternately attenuating and transmitting bands of randomly varying width to provide an autocorrelation function with a unique maximum.

5. Apparatus for the determination of the position of an object as claimed in claim 4 wherein the widths of said bands vary in accordance with a Barker code.

6. Apparatus for the determination of the position of an object as claimed in claim 5 wherein the variation of the width of said bands is modulated with a predetermined periodic variation to provide a fiducial pattern.

7. Apparatus for the determination of the position of an object as claimed in claim 6 wherein said periodic variation is a Barker code.

* * * * *